United States Patent
Khalfan et al.

(10) Patent No.: US 12,141,791 B2
(45) Date of Patent: Nov. 12, 2024

(54) SYSTEMS AND METHODS TO ADJUST A UNIT OF EXPERIENCE BASED ON DIGITAL ASSETS OF USERS

(71) Applicant: Disney Enterprises, Inc., Burbank, CA (US)

(72) Inventors: Alif Khalfan, Redwood City, CA (US); Benjamin Lopez Barba, Rancho Cucamonga, CA (US); Zachary Shalett, Los Angeles, CA (US); Brianna Cochran, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 55 days.

(21) Appl. No.: 17/982,360

(22) Filed: Nov. 7, 2022

(65) Prior Publication Data

US 2024/0152909 A1    May 9, 2024

(51) Int. Cl.
*G06Q 20/00*    (2012.01)
*G06Q 20/36*    (2012.01)
*G06Q 20/40*    (2012.01)

(52) U.S. Cl.
CPC ..... *G06Q 20/3674* (2013.01); *G06Q 20/4015* (2020.05); *G06Q 2220/00* (2013.01)

(58) Field of Classification Search
CPC ........... G06Q 20/3674; G06Q 20/4015; G06Q 2220/00

(Continued)

(56) References Cited

U.S. PATENT DOCUMENTS 1,004,331 A    9/1911  Wright
1,004,624 A    10/1911 Brann
(Continued)

FOREIGN PATENT DOCUMENTS

CN    113193965 B    10/2021
IN    1381KOL2007    4/2009
(Continued)

OTHER PUBLICATIONS

"Dubai parks, etisalat to create an integrated smart theme park"; Gulf News; Jan. 13, 2016 (2 pages).
(Continued)

*Primary Examiner* — Dante Ravetti
(74) *Attorney, Agent, or Firm* — Esplin & Associates, PC

(57) ABSTRACT

Systems and methods to adjust a unit of experience based on digital assets of users are disclosed. Exemplary implementations may: manage first user information of a first user; receive an authentication request from the first user; determine whether the authentication information input is valid by comparing the authentication information input and first authentication information included in the first user information; determine, responsive to determination that the authentication information input is valid, a set of one or more digital assets that are associated with a first address included in a first digital wallet of the first user based on one or more transactions including the first address and the one or more digital assets of the set; determine a set of one or more entities correlated to the set of the one or more digital assets; determine and effectuate adjustments to the first unit of experience based on the correlated entities.

16 Claims, 3 Drawing Sheets

(58) Field of Classification Search
USPC .................. 705/16, 21, 59; 380/44, 262
See application file for complete search history.

(56) References Cited

U.S. PATENT DOCUMENTS

| | | | |
|---|---|---|---|
| 5,299,291 | A | 3/1994 | Ruetz |
| 5,766,077 | A | 6/1998 | Hongo |
| 6,007,338 | A | 12/1999 | Dinunzio |
| 6,053,815 | A | 4/2000 | Hara |
| 6,200,138 | B1 | 3/2001 | Ando |
| 6,691,032 | B1 | 2/2004 | Irish |
| 7,081,033 | B1 | 7/2006 | Mawle |
| 7,266,847 | B2 | 9/2007 | Pauker |
| 7,739,371 | B2 | 6/2010 | Ikegaya |
| 7,837,544 | B2 | 11/2010 | Tipping |
| 8,078,163 | B2 | 12/2011 | Lemond |
| 8,190,295 | B1 | 5/2012 | Garretson |
| 8,758,126 | B2 | 6/2014 | Bavitz |
| 8,762,227 | B1 | 6/2014 | Fox |
| 8,831,228 | B1 | 9/2014 | Agrawal |
| 8,882,595 | B2 | 11/2014 | Chowdhary |
| 8,894,462 | B2 | 11/2014 | Leyland |
| 8,941,690 | B2 | 1/2015 | Seder |
| 8,948,541 | B2 | 2/2015 | Neville |
| 8,988,465 | B2 | 3/2015 | Baron |
| 9,007,400 | B2 | 4/2015 | Takahashi |
| 9,008,310 | B2 | 4/2015 | Nelson |
| 9,266,018 | B2 | 2/2016 | Story |
| 9,293,042 | B1 | 3/2016 | Wasserman |
| 9,327,189 | B2 | 5/2016 | Bavitz |
| 9,361,730 | B2 | 6/2016 | Keating |
| 9,467,515 | B1 | 10/2016 | Penilla |
| 9,610,510 | B2 | 4/2017 | Comploi |
| 9,643,086 | B2 | 5/2017 | Tipping |
| 9,669,302 | B2 | 6/2017 | Park |
| 9,674,361 | B2 | 6/2017 | Ristock |
| 9,715,764 | B2 | 7/2017 | Alaniz |
| 9,744,448 | B2 | 8/2017 | Mullen |
| 9,814,991 | B2 | 11/2017 | Van Winkle |
| 9,818,228 | B2 | 11/2017 | Lanier |
| 9,821,920 | B2 | 11/2017 | Cole |
| 9,922,466 | B2 | 3/2018 | Donnelly |
| 10,019,070 | B2 | 7/2018 | Szczerba |
| 10,025,431 | B2 | 7/2018 | Li |
| 10,043,316 | B2 | 8/2018 | Donnelly |
| 10,043,999 | B2 | 8/2018 | Senoo |
| 10,045,147 | B2 | 8/2018 | Dickow |
| 10,046,241 | B1 | 8/2018 | Krosky |
| 10,059,347 | B2 | 8/2018 | Thieberger-Navon |
| 10,123,155 | B2 | 11/2018 | Grover |
| 10,140,464 | B2 | 11/2018 | Lebeck |
| 10,162,998 | B2 | 12/2018 | Park |
| 10,186,065 | B2 | 1/2019 | Anderson |
| 10,310,600 | B2 | 6/2019 | Hong |
| 10,339,711 | B2 | 7/2019 | Ng-Thow-Hing |
| 10,366,290 | B2 | 7/2019 | Wang |
| 10,376,776 | B2 | 8/2019 | Lowe |
| 10,423,999 | B1 | 9/2019 | Doctor |
| 10,482,669 | B2 | 11/2019 | Rober |
| 10,501,053 | B2 | 12/2019 | Tokunaga |
| 10,506,092 | B1 | 12/2019 | Stephenson |
| 10,572,123 | B2 | 2/2020 | Penilla |
| 10,585,471 | B2 | 3/2020 | Reichow |
| 10,589,625 | B1 | 3/2020 | Goslin |
| 10,639,557 | B2 | 5/2020 | Hake |
| 10,785,621 | B1 | 9/2020 | Drake |
| 10,841,632 | B2 | 11/2020 | Chao |
| 10,969,748 | B1 | 4/2021 | Goslin |
| 10,970,560 | B2 | 4/2021 | Khalfan |
| 11,076,276 | B1 | 7/2021 | Nocon |
| 11,228,436 | B1 | 1/2022 | Foley |
| 11,251,978 | B2 | 2/2022 | Ingraham |
| 11,369,878 | B1 | 6/2022 | Koch |
| 11,605,062 | B2 | 3/2023 | Prakash |
| 2001/0025287 | A1 | 9/2001 | Okabe |
| 2003/0027636 | A1 | 2/2003 | Covannon |
| 2003/0104824 | A1 | 6/2003 | Hale |
| 2003/0130031 | A1 | 7/2003 | Yoshida |
| 2004/0059922 | A1 | 3/2004 | Harris |
| 2005/0021192 | A1 | 1/2005 | Takafuji |
| 2005/0059483 | A1 | 3/2005 | Borge |
| 2005/0144091 | A1 | 6/2005 | Harper |
| 2006/0052153 | A1 | 3/2006 | Vlazny |
| 2006/0143270 | A1 | 6/2006 | Wodtke |
| 2006/0224456 | A1 | 10/2006 | Walker |
| 2006/0277100 | A1 | 12/2006 | Parham |
| 2007/0060233 | A1 | 3/2007 | Liccardo |
| 2007/0087834 | A1 | 4/2007 | Moser |
| 2007/0093299 | A1 | 4/2007 | Bergeron |
| 2007/0139671 | A1 | 6/2007 | Stevens |
| 2007/0197275 | A1 | 8/2007 | Gagner |
| 2007/0206023 | A1 | 9/2007 | Street |
| 2008/0091782 | A1 | 4/2008 | Jakobson |
| 2008/0105751 | A1 | 5/2008 | Landau |
| 2008/0148067 | A1 | 6/2008 | Sitrick |
| 2008/0200244 | A1 | 8/2008 | Rowe |
| 2008/0309010 | A1 | 12/2008 | Bowling |
| 2008/0311983 | A1 | 12/2008 | Koempel |
| 2009/0069084 | A1 | 3/2009 | Reece |
| 2009/0079705 | A1 | 3/2009 | Sizelove |
| 2009/0137323 | A1 | 5/2009 | Fiegener |
| 2009/0176566 | A1 | 7/2009 | Kelly |
| 2009/0313358 | A1 | 12/2009 | Shepherd |
| 2010/0033427 | A1 | 2/2010 | Marks |
| 2010/0093421 | A1 | 4/2010 | Nyman |
| 2010/0098092 | A1 | 4/2010 | Luo |
| 2010/0130296 | A1 | 5/2010 | Ackley |
| 2010/0182340 | A1 | 7/2010 | Bachelder |
| 2010/0268661 | A1 | 10/2010 | Levy |
| 2010/0324984 | A1 | 12/2010 | Pelto |
| 2010/0331721 | A1 | 12/2010 | Epley |
| 2011/0098092 | A1 | 4/2011 | Reiche, III |
| 2011/0183754 | A1 | 7/2011 | Alghamdi |
| 2011/0216948 | A1 | 9/2011 | Yalla |
| 2012/0089275 | A1 | 4/2012 | Yao-Chang |
| 2012/0142415 | A1 | 6/2012 | Lindsay |
| 2012/0256945 | A1 | 10/2012 | Kidron |
| 2012/0264518 | A1 | 10/2012 | Rouille |
| 2012/0289122 | A1 | 11/2012 | Elliott |
| 2012/0295703 | A1 | 11/2012 | Reiche |
| 2012/0295704 | A1 | 11/2012 | Reiche |
| 2013/0030645 | A1 | 1/2013 | Divine |
| 2013/0083003 | A1 | 4/2013 | Perez |
| 2013/0083061 | A1 | 4/2013 | Mishra |
| 2013/0157607 | A1 | 6/2013 | Paek |
| 2013/0166147 | A1 | 6/2013 | Chudzinski |
| 2013/0274024 | A1 | 10/2013 | Geylik |
| 2013/0296058 | A1 | 11/2013 | Leyland |
| 2014/0067208 | A1 | 3/2014 | Klappert |
| 2014/0100020 | A1 | 4/2014 | Carroll |
| 2014/0100029 | A1 | 4/2014 | Reiche |
| 2014/0128144 | A1 | 5/2014 | Bavitz |
| 2014/0128145 | A1 | 5/2014 | Hwang |
| 2014/0129640 | A1 | 5/2014 | Ogawa |
| 2014/0162785 | A1 | 6/2014 | Reiche |
| 2014/0163771 | A1 | 6/2014 | Demeniuk |
| 2014/0189017 | A1 | 7/2014 | Prakash |
| 2014/0201004 | A1 | 7/2014 | Parundekar |
| 2014/0274313 | A1 | 9/2014 | Bala |
| 2014/0295963 | A1 | 10/2014 | Ishikawa |
| 2014/0342790 | A1 | 11/2014 | Kim |
| 2015/0003609 | A1 | 1/2015 | Nelson |
| 2015/0024852 | A1 | 1/2015 | Pacey |
| 2015/0065237 | A1 | 3/2015 | Hohn |
| 2015/0080125 | A1 | 3/2015 | Andre |
| 2015/0097860 | A1 | 4/2015 | Alaniz |
| 2015/0097864 | A1 | 4/2015 | Alaniz |
| 2015/0100179 | A1 | 4/2015 | Alaniz |
| 2015/0134371 | A1 | 5/2015 | Shivakumar |
| 2015/0145671 | A1 | 5/2015 | Cohen |
| 2015/0174479 | A1 | 6/2015 | Reiche |
| 2015/0202962 | A1 | 7/2015 | Habashima |
| 2015/0269780 | A1 | 9/2015 | Herman |
| 2015/0294505 | A1 | 10/2015 | Atsmon |

(56) References Cited

U.S. PATENT DOCUMENTS

| | | |
|---|---|---|
| 2015/0339910 A1 | 11/2015 | Stenzler |
| 2015/0346722 A1 | 12/2015 | Herz |
| 2015/0363092 A1 | 12/2015 | Morton |
| 2016/0005070 A1 | 1/2016 | Burr |
| 2016/0042607 A1 | 2/2016 | McCoy |
| 2016/0071397 A1 | 3/2016 | Logan |
| 2016/0096114 A1 | 4/2016 | Van Winkle |
| 2016/0189444 A1 | 6/2016 | Madhok |
| 2016/0199730 A1 | 7/2016 | Olson |
| 2016/0206955 A1 | 7/2016 | Goslin |
| 2016/0206957 A1 | 7/2016 | Goslin |
| 2016/0216854 A1 | 7/2016 | McClellan |
| 2016/0224939 A1 | 8/2016 | Chen |
| 2016/0299567 A1 | 10/2016 | Crisler |
| 2016/0310839 A1 | 10/2016 | Leyland |
| 2016/0313792 A1 | 10/2016 | Siegel |
| 2016/0346704 A1 | 12/2016 | Wagner |
| 2017/0021273 A1 | 1/2017 | Rios |
| 2017/0021282 A1 | 1/2017 | Comploi |
| 2017/0045946 A1 | 2/2017 | Smoot |
| 2017/0050743 A1 | 2/2017 | Cole |
| 2017/0068311 A1 | 3/2017 | Evans |
| 2017/0072316 A1 | 3/2017 | Finfter |
| 2017/0078621 A1 | 3/2017 | Sahay |
| 2017/0103571 A1 | 4/2017 | Beaurepaire |
| 2017/0106288 A1 | 4/2017 | Reiche |
| 2017/0132334 A1 | 5/2017 | Levinson |
| 2017/0154024 A1 | 6/2017 | Subramanya |
| 2017/0158023 A1 | 6/2017 | Stevanovic |
| 2017/0166221 A1 | 6/2017 | Osterman |
| 2017/0203205 A1 | 7/2017 | Nelson |
| 2017/0236130 A1 | 8/2017 | Kee |
| 2017/0236328 A1 | 8/2017 | Eatedali |
| 2017/0253252 A1 | 9/2017 | Donnelly |
| 2017/0270502 A1 | 9/2017 | Finbow |
| 2017/0300999 A1 | 10/2017 | Wilkinson |
| 2017/0330034 A1 | 11/2017 | Wang |
| 2017/0344754 A1 | 11/2017 | Kumar |
| 2017/0352185 A1 | 12/2017 | Bonilla Acevedo |
| 2018/0008894 A1 | 1/2018 | Sack |
| 2018/0011988 A1 | 1/2018 | Ziegler |
| 2018/0040162 A1 | 2/2018 | Donnelly |
| 2018/0040163 A1 | 2/2018 | Donnelly |
| 2018/0043272 A1 | 2/2018 | Van Winkle |
| 2018/0089900 A1 | 3/2018 | Rober |
| 2018/0089901 A1 | 3/2018 | Rober |
| 2018/0096501 A1 | 4/2018 | Anderson |
| 2018/0181412 A1 | 6/2018 | Paratey |
| 2018/0231973 A1 | 8/2018 | Mattingly |
| 2018/0247352 A1 | 8/2018 | Rogers |
| 2018/0247364 A1 | 8/2018 | Nakadai |
| 2018/0342001 A1 | 11/2018 | Chavarria |
| 2018/0369702 A1 | 12/2018 | Hake |
| 2019/0001987 A1 | 1/2019 | Kim |
| 2019/0014070 A1 | 1/2019 | Mertvetsov |
| 2019/0047498 A1 | 2/2019 | Alcaidinho |
| 2019/0065970 A1 | 2/2019 | Bonutti |
| 2019/0075437 A1 | 3/2019 | Shaikh |
| 2019/0101976 A1 | 4/2019 | Reichow |
| 2019/0157607 A1 | 5/2019 | Kim |
| 2019/0220674 A1 | 7/2019 | Khalfan |
| 2019/0299105 A1 | 10/2019 | Knight |
| 2019/0385213 A1 | 12/2019 | Pande |
| 2020/0005284 A1* | 1/2020 | Vijayan ............ H04L 9/3247 |
| 2020/0053400 A1 | 2/2020 | Chao |
| 2020/0074181 A1 | 3/2020 | Chang |
| 2020/0151768 A1 | 5/2020 | Dekeyser |
| 2020/0163616 A1 | 5/2020 | Sakaya |
| 2020/0193163 A1 | 6/2020 | Chang |
| 2020/0376387 A1 | 12/2020 | Packin |
| 2021/0016184 A1 | 1/2021 | Kalama |
| 2021/0056762 A1 | 2/2021 | Robbe |
| 2021/0217026 A1 | 7/2021 | Hassani |
| 2021/0256070 A1 | 8/2021 | Bao |
| 2021/0284088 A1 | 9/2021 | Yamaguchi |
| 2021/0287195 A1 | 9/2021 | Prakash |
| 2022/0004600 A1 | 1/2022 | Bangole |
| 2022/0069996 A1 | 3/2022 | Xue |
| 2022/0148268 A1 | 5/2022 | Yilanci |
| 2022/0248072 A1 | 8/2022 | Gupta |
| 2022/0258059 A1 | 8/2022 | Murcin |
| 2022/0266148 A1 | 8/2022 | Koch |
| 2023/0036724 A1 | 2/2023 | Khalfan |
| 2023/0052381 A1 | 2/2023 | Khalfan |
| 2023/0142101 A1 | 5/2023 | Hirasawa |

FOREIGN PATENT DOCUMENTS

| | | |
|---|---|---|
| JP | 2019065430 | 4/2019 |
| WO | 2007101785 A1 | 9/2007 |
| WO | 2018128946 A1 | 7/2018 |

OTHER PUBLICATIONS

"Dynamic NFTs for each player in the 2022 NBA Playoffs"; The Association NFT; https://theassociationnft.com/#/ ; 2022 (5 pages).

"The Aeternals: New NFT and Interactive Technology"; Business Wire; Mar. 2, 2022 (3 pages).

"What is a dynamic NFT"; Chainlink; https://blog.chain.link/what-is-a-dynamic-nft/ ; Apr. 7, 2022 (10 pages).

Adelyn Zhou; "The Next Wave of NFTs will be Dynamic"; Nasdaq; Mar. 29, 2021 (8 pages).

Charlotte Coates; "NFTs: the next big thing for the attractions industry"; Sep. 21, 2021 (14 pages).

Cory Himel; "Developers can use gamification"; Gigster, Mar. 16, 2022 (5 pages).

Lucas Caciolo; "Decentralized theme parks promise kids virtual prizes to earn as they learn"; forkast; Jun. 29, 2021 (4 pages).

Adam Hartley, 5 Predictions for the Future of in-Car Entertainment, Apr. 9, 2019 [https://360.here.com/5-predictions-for-the-future-of-in-car-leisure-entertainment], (5 pages).

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hacking [retrieved on Nov. 12, 2014] (8 pgs).

Kloster, Benjamin, 'Wanted: Encryption Scheme for Copy Protection Purposes', Retrieved from the Internet http://stackoverflow.com/questions/14529732/wanted-encryption-scheme-for-copy-protection-purposes, Jan. 25, 2013, XP055152568, 2 pages.

Dagamant, 'Skylanders Hacking', Retrieved from the Internet http://web.archive.ora/web/20120309212642/http://www.suncries.com/skvlaners-hacking Feb. 27, 2012, XP055152538, 8 pages.

Extended European Search Report issued in European Patent Application No. 14175300.4, dated Nov. 19, 2014. (6 pgs).

"Video Game/ Battle Circuit", TV Tropes, available at «https://web.archive.org/web/20150114005112/http://tvtropes.org/pmwiki/pmwiki.php/VideoGameBattleCircuit» (4 pages).

"Battle Circuit", Capcom, available at «https://web.archive.org/web/20000111073021/http://www.capcom.co.jp/newproducts/arcade/battle/bs-top.html» (Orig in al Japanese web page followed by English translation), 4 pages.

Apple (Developing Wireless CarPlay System, https://developer.apple.com/videos/play/wwdc2017/717/WWDC 2017, video and slide). (Year: 2017).

NPX "Software-Apple-Carplay: Software Technology for CarPlay", https://www.nxp.com/design/software/embedded-software/software-technology-for-carplay:SOFTWARE-APPLE-CARPLAY (Year: 2020), 3 pages.

Google search "Iphone Figurine" (Year: 2020), 1 page.

(56) References Cited

OTHER PUBLICATIONS https://maiarlaunchpad.com/holoride_Litepaper_V2.1_Nov21.pdf, pp. 1-26.
https://www.ibm.com/downloads/cas/M8AOGADZ, 2018, pp. 1-8.
IBM Institute for Business Value, "Blockchain for mobility services" https://www.IBM.com/downloads/cas/M8AOGADZ ; Jan. 2018 (8 pages).
Holoride, "Adding Thrill to Every Ride" Conceptual Litepaper V.2.1; https://malarlaunchpad.com/holoride_Litepaper_V2.1_Nov21.pdf ; Nov. 2021 (26 pages).
Dobbins et al. "Creating Human Digital Memories for a Richer Recall of Life Experiences" 2013 10th IEEE Internaional Conference on Networking, Sensing and Control, pp. 246-251 (Year: 2013).
Olsson et al. "User-Centered Design of a Mobile Application for Sharing Life Memories," Proceedings of the 4th international conference on mobile technology, applications, and systems and the 1st international symposium on Computer human interaction in mobile technology—Mobility '07, pp. 524-531, (Year: 2007).

\* cited by examiner

SYSTEMS AND METHODS TO ADJUST A UNIT OF EXPERIENCE BASED ON DIGITAL ASSETS OF USERS

FIELD OF THE DISCLOSURE

The present disclosure relates to systems and methods to adjust a unit of experience based on digital assets of users.

BACKGROUND

Users may own a plurality of digital assets, such as non-fungible tokens. Proof of ownership of the digital assets may not present immediate benefits that the users or other users around them can tangibly experience.

SUMMARY

One aspect of the present disclosure relates to a system configured to adjust a unit of experience based on digital assets of users. The digital assets may be maintained by decentralized ledger(s), thereby recording ownership of the digital assets and entities they are correlated with. Furthermore, such ownership may be immutable unless owners of the digital assets initiate transactions to change the ownership and such transactions are recorded on the decentralized ledger. The digital assets owned by the users and entities correlated to the digital assets may be determined and the basis of adjustments to cause to a unit of experience. Thus, individual users/owners may affect tangible and/or visual experiences by way of their digital assets.

The system may include one or more hardware processors configured by machine-readable instructions, a user management component, decentralized ledger server(s), and/or other components The machine-readable instructions may include one or more instruction components. The instruction components may include computer program components. The instruction components may include one or more of authentication component, digital asset determination component, entity determination component, experience determination component, experience adjusting component, and/or other instruction components.

The user management component may be configured to manage user information of users including first user information of a first user. The user information may include authentication information, addresses recorded on a decentralized ledger and includes in digital wallets associated with the users, identifying information of the users, and/or other user information.

The decentralized ledger may record transactions that include digital assets and the addresses such that the users own the digital assets. The digital assets may be correlated with entities. The first user information may include first authentication information, a first address recorded on the decentralized ledger and included in a first digital wallet associated with the first user, first identifying information of the first user, and/or other information.

The authentication component may be configured to receive an authentication request from the first user. The authentication request may include authentication information input for the first user. The authentication component may be configured to determine whether the authentication information input is valid by comparing the authentication information input and the first authentication information.

The digital asset determination component may be configured to determine, responsive to determination that the authentication information input is valid, a set of one or more digital assets that are associated with the first address included in the first digital wallet of the first user based on one or more of the transactions including the first address and the one or more digital assets of the set.

The entity determination component may be configured to determine a set of one or more entities correlated to the set of the one or more digital assets. The entities may include content stored in electronic storage.

The experience determination component may be configured to determine a first unit of experience that the first user may be to attend.

The experience adjusting component may be configured to determine adjustments to the first unit of experience based on the correlated entities. The experience adjusting component may be configured to effectuate the adjustments during the first unit of experience.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
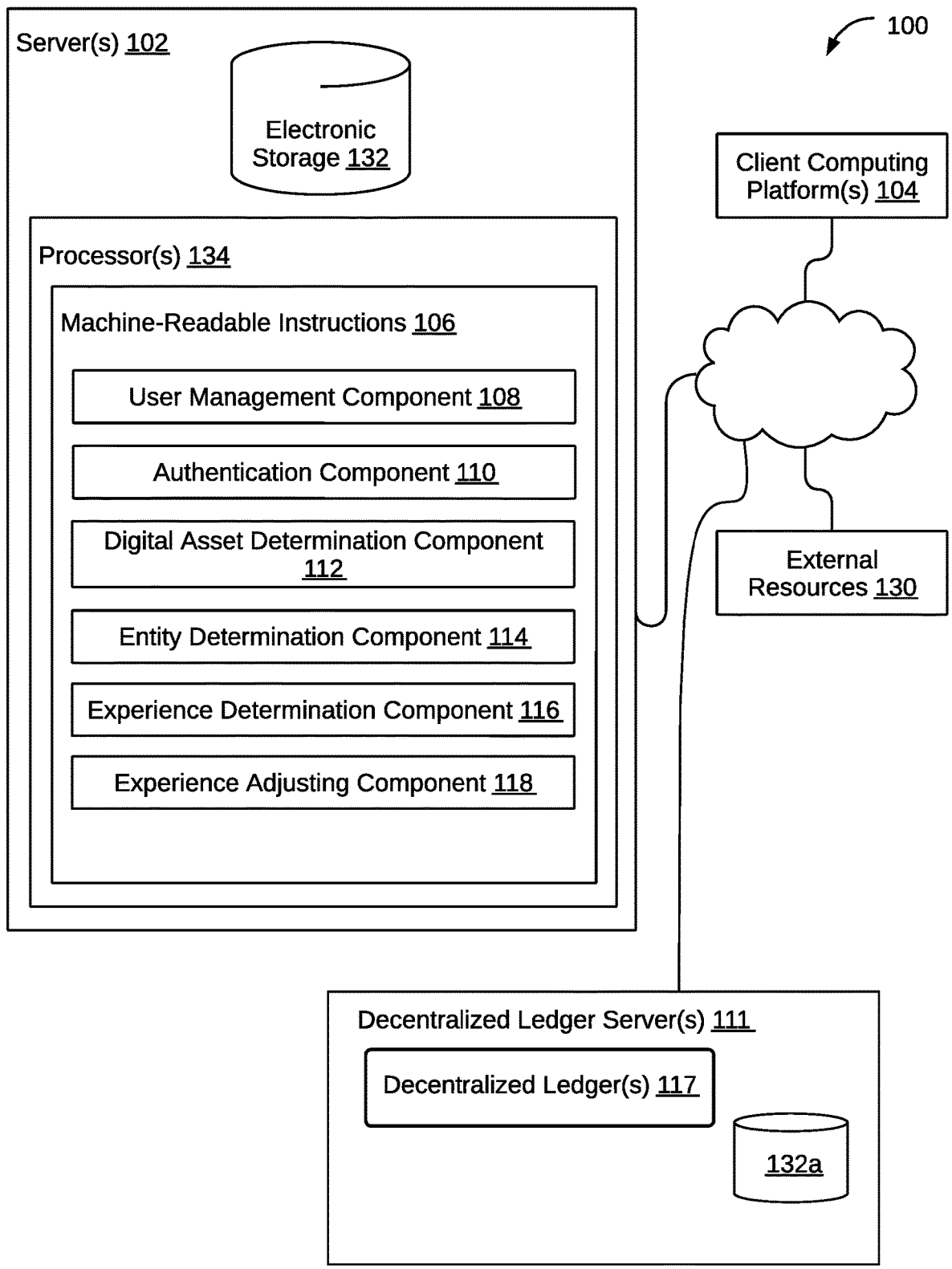
FIG. 1 illustrates a system configured to adjust a unit of experience based on digital assets of users, in accordance with one or more implementations.

FIG. 1 illustrates a system 100 configured to adjust a unit of experience based on digital assets of users, in accordance with one or more implementations. In some implementations, system 100 may include user management component 108, one or more servers 102, decentralized ledger server(s) 111, and/or other components. Electronic storage 132a may be similar to electronic storage 132 as described elsewhere in this disclosure, though included in decentralized ledger server(s) 111 as depicted in FIG. 1.

As used herein, the term "digital asset" may refer to a serial code tracked on one or more decentralized ledgers. The digital assets may be uniquely identified and/or uniquely identifiable. As used herein, rights pertaining to digital assets may be tracked, recorded, and/or otherwise registered on one or more decentralized ledgers. As such, an individual digital asset may be a ledger-tracked digital asset.

Individual digital assets may be correlated with another entity (which may be referred to as a "correlated entity") by virtue of technology provided and/or supported by the one or more decentralized ledgers on which the rights pertaining to the individual digital assets are tracked (including but not limited to smart contracts and/or other executable code on the one or more permanent registries). Accordingly, rights pertaining to a digital asset may correlate to the provision of one or more rights (e.g., accessibility) with respect to the correlated entity (e.g., control and/or other accessibility). Transactions involving a digital asset recorded on a decentralized ledger may correlate to certain transactions (or modifications) of the correlated entity, and/or vice versa.

Various types and/or combinations of correlated entities are envisioned within the scope of this disclosure, including but not limited to physical and/or virtual objects, content, items, rights, memberships, grants, etc. The use of the singular "entity" or "correlated entity" is not intended to be limiting, as multiple different objects, content, items, rights, memberships, grants, etc. may be correlated to a single digital asset. By way of non-limiting example, a correlated entity may be a physical item (e.g., artwork, a ticket to an event), a subscription to certain media content, content and so forth. The content may include an image, a video, a graphic image file, a signature of notoriety, a sound bite of an audio file, the audio file, and/or other content. In some implementations, the correlated entity may refer to any item or object related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or one-of-a-kind. For example, a specific individual may be non-fungible. A digital asset may be semi-fungible if there is a set of a limited number of similar but distinguishable digital assets. For example, a limited amount of images of a sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets.

Decentralized ledger server(s) 111 may be used to implement one or more decentralized ledger(s) 117. In some implementations, one or more decentralized ledger(s) 117 may be decentralized and/or immutable registries or ledgers. In some implementations, decentralized ledger(s) 117 may be one or more databases on which rights pertaining to the individual digital assets are tracked and/or recorded. In some implementations, decentralized ledger(s) 117 may be maintained by distributed computing platforms (not shown in FIG. 1). In some implementations, a distributed computing platform may be implemented by a set of client computing platforms and/or servers (including, for example, one or more decentralized ledger server(s) 111). In some implementations, client computing platform(s) 104 may be the distributed platform(s). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of decentralized ledger(s) 117. The smart contracts may be stored on decentralized ledger(s) 117 and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledger(s) 117 implemented by decentralized ledger server(s) 111 is a private permissioned decentralized ledger. The private permissioned decentralized ledger may be configured to record information, record the transactions, and/or track addresses (e.g., corresponding to/included in digital wallets, smart contracts, etc.). The transactions recorded on decentralized ledger(s) 117 may include the digital assets and the addresses, thus proving or indicating that the users own the digital assets. The recorded information may pertain to one or more digital assets recorded on decentralized ledger(s) 117. The recorded information may include ownership of the digital assets and/or other assets. For example, ownership rights and/or other rights may be modified. In some implementations, a digital asset may be removed from one decentralized ledger and added or recorded on another decentralized ledger. In some implementations, at least one of the decentralized ledger(s) 117 implemented by decentralized ledger server(s) 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of decentralized ledger(s) 117 ledger may be grouped together in units that are referred to as blocks. For example, an individual block may include one or more digital assets (e.g., digital assets) and/or one or more transactions related to the one or more digital assets. For example, an individual block may be linked to one or more other individual blocks. Individual blocks may be linked or chained together to form a structure of blocks and/or a hierarchy of blocks, such as, e.g., a chain of blocks. An individual block may include one or more assets (e.g., digital assets), one or more transactions, and/or other information.

In some implementations, an individual decentralized ledger server(s) 111 may be dedicated to a particular node of a decentralized ledger(s) 117. Typically, different nodes are included in (or implemented by, or hosted by) different servers or different computer systems to increase the safety and security of transactions on a decentralized ledger and/or blockchain. The consensus protocol used for a particular blockchain will be harder to falsify or circumvent when the different nodes are in different geographical locations, on different types of computing platforms, and/or otherwise distributed and diverse.

In some implementations, one or more decentralized ledger(s) 117 implemented by decentralized ledger server(s) 111 may be publicly accessible. In some implementations, one or more decentralized ledger(s) 117 implemented by decentralized ledger server(s) 111 may be private and/or permissioned. In some implementations, one or more decentralized ledger(s) 117 implemented by decentralized ledger server(s) 111 may be append-only. In some implementations, existing blocks and/or nodes of one or more decentralized ledger(s) 117 implemented by decentralized ledger server(s) 111 can substantially not be altered or deleted, unless multiple copies are altered. This is unlikely to happen provided that the multiple copies stored on different computing platforms, e.g., in different geographical locations, in accordance with the relevant consensus protocol(s). Decentralized ledger(s) 117 may be replicated on multiple computing platforms, preferably in multiple different geographical locations. Additionally, individual blocks and/or nodes may be linked together in a manner that prevents tampering, such as using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, individual nodes, transactions, and/or assets may be digitally signed in a manner that proves integrity and/or prevents tampering, e.g., by providing authentication, as well as repudiation.

User management component 108 may be configured to manage user information of users, including first user information of a first user and/or other user information for other users. The user information may include authentication information, the addresses recorded on decentralized ledger(s) 117 and included in digital wallets associated with the users, identifying information of the users, and/or other user information. By way of non-limiting example, the first user information may include first authentication information, a first address recorded on the decentralized ledger and included in a first digital wallet associated with the first user, first identifying information of the first user, and/or other first user information.

Individual ones of the authentication information may facilitate identity verification of the users. The identity verification of the users may facilitate verification of the digital wallets associated with the users. Individual ones of the digital wallets may include a private key, a public key, an address generated based on the public key and a hash function, and/or other information. The private key may provide or authorize the user, or anyone who possesses the private key, with access to consideration sent to the address. The private key may authorize and initiate transactions of the consideration from the address. The consideration, by way of non-limiting example, may include currency, cryptocurrency, digital assets, and/or other consideration.

The authentication information may include biometric information, a passcode, a password, a pass phrase, and/or other authentication information that facilitate with verifying the identity of the users. The biometric information may include a fingerprint, a retinal pattern, a hand scan, a face scan, voice, DNA sample, and/or other biometric information. The passcode, the password, and the pass phrase may be set by the individual users or assigned to the individual users. The identifying information may identify the users, and in some implementations, facilitate in verifying the identity of the users. The identifying information for a given user may include a name, a birthdate, a mailing address, an email address, a username, a membership number, and/or other identifying information.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of authentication component 110, digital asset determination component 112, entity determination component 114, experience determination component 116, experience adjusting component 118, and/or other instruction components.

Authentication component 110 may be configured to receive an authentication request from the first user. Receiving the authentication request from the first user may include receiving the authentication request from client computing platform 104 associated with the first user, from client computing platform 104 associated with units of experience (described herein) through which the users provided their authentication request, or from other sources. The authentication request may include authentication information input for the first user, an indication that the user is requesting to be authenticated, and/or other requests. In some implementations, the authentication request may be received upon the first user entering boundaries of a site, such as an amusement park, a stadium, or a venue.

The authentication information input may include user input entered by the users into client computing platforms 104 associated with the units of experience and/or into client computing platform 104 associated with the users, output signals from a physical item associated with the user, the biometric information of the user via client computing platform 104 associated with the users or the units of experience, and/or other authentication information input. In some implementations, more than one of the authentication information may be received. The user input may include a particular passcode, a particular password, a particular pass phrase, the identifying information, and/or other user input that facilitates identity verification of the users. In some implementations, the output signals may convey the passcode, the password, the pass phrase, the identifying information, and/or other information that facilitates identity verification of the user.

By way of non-limiting example, the physical item may include a personal computing platform (e.g., smartphone, tablet, portable computer, etc.), a smart watch, a fob, a key card, and/or other physical items that include radio frequency identification (RFID) that provide the output signals. In some implementations, the output signals may be received by authentication component 110 upon the physical item being within a location area of a given unit of experience or along a location path of the given unit of experience. In some implementations, the physical item, such as the fob or the smart watch, may be included within another object. For example, the object may include a toy (e.g., a figurine, a stuffed animal), a wearable accessory (e.g., a headwear piece, a jewelry piece, etc.) and/or other object.

Authentication component 110 may be configured to determine whether the authentication information input is valid by comparing the authentication information input and the first authentication information. The authentication information input determined as valid may indicate the identity of the user is verified. The authentication information input determined as invalid may indicate the identity of the user is unverified. Comparing the authentication information with the authentication information input may include determining whether the authentication information input is the same as the authentication information, whether a majority of the authentication information input is the same as the authentication information, and/or other techniques to determine whether the authentication information input and the authentication information verify the identity of the user or not.

Digital asset determination component 112 may be configured to determine a set of one or more digital assets that are associated with the first address included in the first digital wallet of the first user. The determination may be made responsive to determination that the authentication information input is valid such that the identity of the first user is verified. The determination may be based on one or more of the transactions including the first address and the one or more digital assets of the set. That is, the transactions recorded on decentralized ledger(s) 117 may indicate the set of the one or more digital assets that the first user owns due to one or more of the transactions including the first address. In some implementations, the addresses included in digital wallets, such as the first address included in the first digital asset, may be accessed due to decentralized ledger(s) 117 being publicly accessible. In some implementations, the digital wallets may include or may be associated with the authentication information (i.e., the user information). Thus, the determination of the set of the one or more digital assets may be based on the authentication information that the digital wallets include and/or comparing the authentication information input to the authentication information that the digital wallets include. In some implementations, the addresses included in the digital wallets may be accessed based on the authentication information and/or the authentication information input due to decentralized ledger(s) 117 being private and/or permissioned. The digital wallets may further indicate ownership of one or more other digital assets and/or other rights to the one or more digital assets.

Entity determination component 114 may be configured to determine a set of one or more entities correlated to the set of the one or more digital assets. In some implementations, the entities may be the content stored in electronic storage 132. In some implementations, the content may be stored in electronic storage 132a in addition to or alternative to electronic storage 132. In some implementations, the set of the one or more content correlated to the set of the one or more digital assets may be determined based on the serial codes that are the set of the one or more digital assets.

Experience determination component 116 may be configured to determine a first unit of experience that the first user may be to attend. Individual units of experience may be attended, participated in, or otherwise experienced by the users. By way of non-limiting example, the units of experience may include a ride attraction, a parade, a show, a virtual reality simulation, a character controlled by the user in a digital environment, or other unit of experience. Individual units of experiences may be associated with a location area or a location path where the unit of experience occurs. The location area may be a particular square footage, a range of global positioning system (GPS) coordinates, an area in between boundaries (e.g., streets, ride attractions), or other location area. The location path may be between GPS coordinates, along a particular boundary, or other location path with a beginning and an end. The parade and the show may be units of experience that multiple users may attend at once in one location area or along one location path. The ride attraction may be a unit of experience that a single user or a set of users, e.g., 2-4 users, may experience at once.

In some implementations, experience determination component 116 may be configured to determine a location of the first user at the receipt of the authentication information input. The location of the first user may be GPS coordinates or other location information. The location of the first user may be based on a location of client computing platform 104 associated with the first user, a location of client computing platform 104 associated with the first unit of experience at which the first user provided the authentication information input, and/or device that may convey the location. As such, determining the first unit of experience that the first user is to attend may include determining whether the location of the first user is within a first location area or location path associated with the first unit of experience. Upon determination that the location of the first user is within or along the first location area or location path, the first unit of experience may be determined. In some implementations, a minimum amount of time and/or at a particular time that the location of the first user is within or along the first location area or location path may be required and determined by experience determination component 116. The minimum amount of time and/or the particular time may be predetermined.

Experience adjusting component 118 may be configured to determine adjustments to the first unit of experience based on the correlated entities. In some implementations, the correlated entities may include or are associated with preset preferences of adjustments to effectuate for the first user. The preset preferences may be defined by the individual users via client computing platforms 104 associated with the users, client computing platforms 104 associated with the units of experience, and/or other user interfaces. In some implementations, the preset preferences may be specific to one or more particular units of experience. In some implementations, the preset preferences may be applicable to all units of experience. In some implementations, the correlated entities may already include or are associated with pre-defined adjustments. By way of non-limiting example, the adjustments to a given unit of experience, such as the first unit of experience, may include adjusting a speed of progression for the unit of experience from a beginning to an end of the unit of experience, a voice narrator that speaks or sings during the unit of experience, animatronics, a projection of visual content, audible content, olfactory content, a character controlled by the user in a digital environment, and/or other features of the units of experience. The animatronics may be automated puppets that perform and/or speak during the unit of experience. The visual content may include background content, projected facial expressions, characters, lighting (e.g., brightness, color), and/or other visual content that the users may see during the unit of experience. The audible content may include soundtrack music, sound effects, and/or other audible content. The olfactory content may include scents that are to be expelled (e.g., smell of cookies, smell of grass, smell of a beach).

The digital environment may be, by way of non-limiting example, a game that the users play or a simulation that the users control pieces of content in. For example, the pieces of content may include the character, a game asset, and/or other pieces of content. The game asset may include a virtual item, a virtual resource (e.g., weapon, tool), in-game powers, in-game skills, in-game technologies, and/or other game assets. In some implementations, the determination of the adjustments to the first unit of experience may be based on the preset preferences.

Experience adjusting component 118 may be configured to determine a frequency of the first unit of experience for the first user based on a frequency of receipt of the authentication information input. The frequency of the first unit of experience may be an amount of times that the first user attends or otherwise experiences the first unit of experience. Prior to each attendance or experience of the individual units of experience, the authentication request may be received from the individual users, and thus the authentication information input. As such, the frequency may be determined. In some implementations, the determination of the adjustments to the first unit of experience may be based on the frequency of the first unit of experience. With every different frequency of the first unit of experience, the adjustments may be different. For example, new visual content may be presented.

In some implementations, experience adjusting component 118 may be configured to determine multiple users that are to attend the first unit of experience at the same time. For example, multiple users may attend individual shows and individual parades. Experience adjusting component 118 may be configured to determine an aggregation of the entities that are correlated with the digital assets in the digital wallets of the multiple users. The adjustments to the first unit of experience may be based on the aggregation. The aggregation may affect the same adjustment or multiple adjustments. For example, the aggregation may cause a particular adjustment to the audible content, or may cause adjustments to the audible content, the speed, and the visual content.

Experience adjusting component 118 may be configured to effectuate the adjustments during the first unit of experience. Thus, the first user may tangibly see effects of their digital assets during the first unit of experience, and other units of experience. It is to be understood that the limitations of the components are described herein in relation to the first unit of experience, the first user, the first digital wallet, and the first address for exemplary purposes only and is not intended to be limiting.

Figure 3:
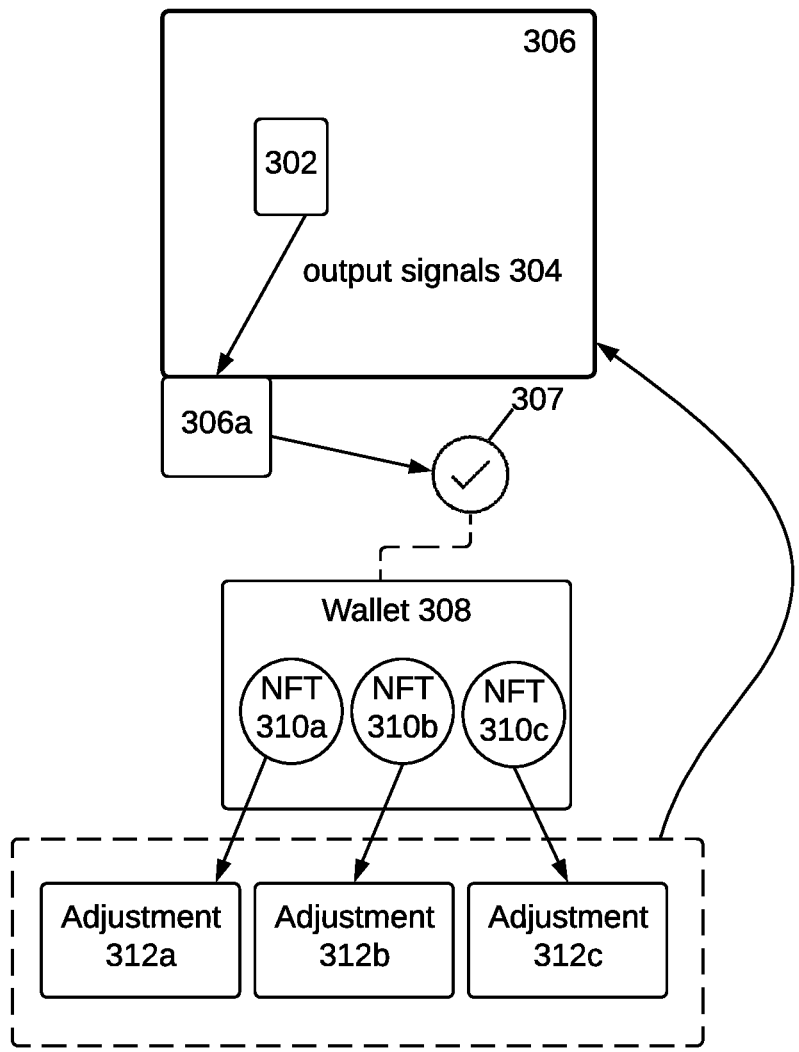
FIG. 3 illustrates an example implementation of the system configured to adjust a unit of experience based on digital assets of users, in accordance with one or more implementations.

FIG. 3 illustrates a physical item 302 that may be within a location area of unit of experience 306 (e.g., a ride attraction). Physical item 302 may be associated or owned by the user (not illustrated). Upon physical item 302 entering the location area of unit of experience 306, output signals 304 may be received by one or more processors 306a (e.g., by authentication component 110 of FIG. 1) associated with unit of experience 306 or a site of unit of experience 306 (e.g., an amusement park) as authentication information input included in an authentication request. Upon determination that the authentication information input is valid 307 against store authentication information associated with the user (not illustrated) and thus the identity of the user is verified, a set of non-fungible tokens (NFTs) 310a, 310b, and 310c included in a digital wallet 308 associated with the user may be determined digital assets. Digital wallet 308 may correspond to an address tracked on a decentralized ledger (not illustrated, similar to decentralized ledger(s) 117 of FIG. 1) such that the decentralized ledger includes transactions involving the address that indicate ownership by the user. NFTs 310a, 310b, and 310c may be individually associated with content and preset preferences of adjustments 312a, 312b, and 312c, respectively, to unit of experience 306. Responsive to determining NFTs 310a, 310b, and 310c, and thus adjustments 312a, 312b, and 312c, such adjustments 312a, 312b, and 312c may be effectuated during unit of experience 306. For example, adjustment 312a may correspond to adjusting interior lighting of a vehicle that the user sits in during unit of experience 306 (e.g., to be a blue hue), adjustment 312b may correspond to adjusting a voice narrator to be a particular movie character's voice, and adjustment 312c may correspond to expelling scents (e.g., a scent of pine trees).

Referring back to FIG. 1, in some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 108, 110, 112, 114, 116, and/or 118, and/or other components. Processor(s) 134 may be configured to execute components 108, 110, 112, 114, 116, and/or 118, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 134 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 134 may be configured to execute one or more additional components that may perform some or all of the functionality attributed below to one of components 108, 110, 112, 114, 116, and/or 118.

Figure 2:
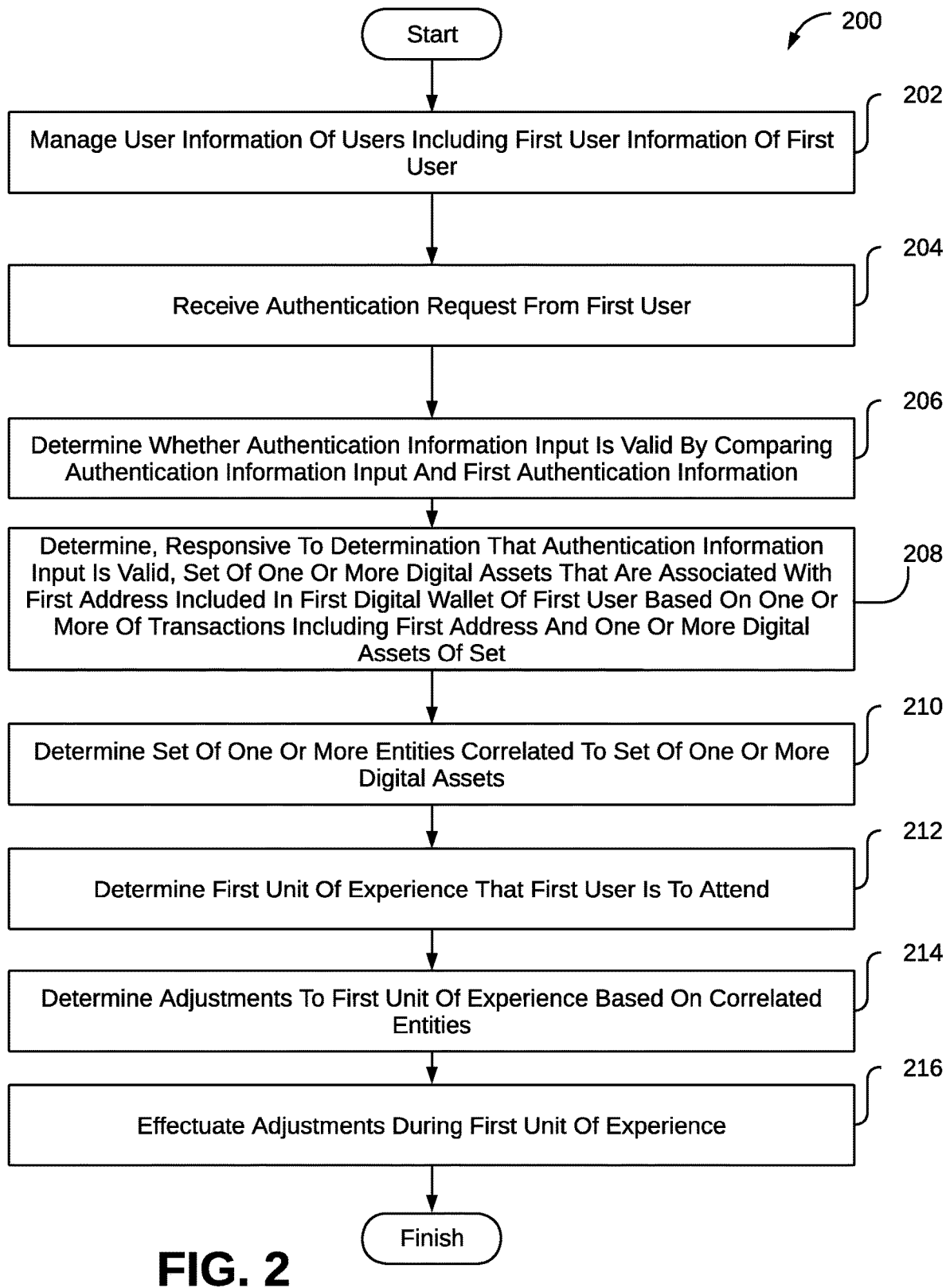
FIG. 2 illustrates a method to adjust a unit of experience based on digital assets of users, in accordance with one or more implementations.

FIG. 2 illustrates a method 200 to adjust a unit of experience based on digital assets of users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include managing user information of users, including a first user information for a first user. Operation 202 may be performed by one or more hardware processors configured by machine-readable instructions including a component that is the same as or similar to user management component 108, in accordance with one or more implementations.

An operation 204 may include receiving an authentication request from the first user. The authentication request may include authentication information input for the first user. Operation 204 may be performed by one or more hardware processors configured by machine-readable instructions including a component that is the same as or similar to authentication component 110, in accordance with one or more implementations.

An operation 206 may include determining whether the authentication information input is valid by comparing the authentication information input and the first authentication information. Operation 206 may be performed by one or more hardware processors configured by machine-readable instructions including a component that is the same as or similar to authentication component 110, in accordance with one or more implementations.

An operation 208 may include determining, responsive to determination that the authentication information input is valid, a set of one or more digital assets that are associated with a first address included in a first digital wallet of a first user. Operation 208 may be performed by one or more hardware processors configured by machine-readable instructions including a component that is the same as or similar to digital asset determination component 112, in accordance with one or more implementations.

An operation 210 may include determining a set of one or more entities correlated to the set of the one or more digital assets. Operation 210 may be performed by one or more hardware processors configured by machine-readable instructions including a component that is the same as or similar to entity determination component 114, in accordance with one or more implementations.

An operation 212 may include determining a first unit of experience that the first user is to attend. Operation 212 may be performed by one or more hardware processors configured by machine-readable instructions including a component that is the same as or similar to experience determination component 116, in accordance with one or more implementations.

An operation 214 may include determining adjustments to the first unit of experience based on the correlated entities. Operation 214 may be performed by one or more hardware processors configured by machine-readable instructions including a component that is the same as or similar to experience adjusting component 118, in accordance with one or more implementations.

An operation 216 may include effectuating the adjustments during the first unit of experience. Operation 216 may be performed by one or more hardware processors configured by machine-readable instructions including a component that is the same as or similar to experience adjusting component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to adjust a unit of experience based on digital assets of users, the system comprising:
a user management component configured to manage user information of users including first user information of a first user, the user information including authentication information, addresses recorded on a decentralized ledger and included in digital wallets associated with the users, and identifying information of the users, wherein the decentralized ledger records transactions that include digital assets and the addresses such that the users own the digital assets, wherein the digital assets are correlated with entities, wherein the first user information includes first authentication information, a first address recorded on the decentralized ledger and included in a first digital wallet associated with the first user, and first identifying information of the first user;
one or more processors configured by machine-readable instructions to implement an authentication component, a digital asset determination component, an entity determination component, an experience determination component, and/or an experience adjusting component to:
receive, by the authentication component, an authentication request from the first user, wherein the authentication request includes authentication information input for the first user;
determine, by the authentication component, whether the authentication information input is valid by comparing the authentication information input and the first authentication information;
determine, by the digital asset determination component, responsive to determination that the authentication information input is valid, a set of one or more digital assets that are associated with the first address included in the first digital wallet of the first user based on one or more of the transactions including the first address and the one or more digital assets of the set;
determine, by the entity determination component, a set of one or more entities correlated to the set of the one or more digital assets, wherein the entities include content stored in electronic storage;
determine, by the experience determination component, a first unit of experience that the first user is to attend; and
determine, by the experience adjusting component, adjustments to the first unit of experience based on the correlated entities;
effectuate, by the experience adjusting component, the adjustments during the first unit of experience.

2. The system of claim 1, wherein the one or more processors are further configured by the machine-readable instructions to:
determine, by the experience adjusting component, a frequency of the first unit of experience for the first user based on a frequency of receipt of the authentication information input, wherein the determination of the adjustments to the first unit of experience is based on the frequency of the first unit of experience.

3. The system of claim 1, wherein the correlated entities include or are associated with preset preferences for the first user, wherein the determination of the adjustments to the first unit of experience is based on the preset preferences.

4. The system of claim 1, wherein the one or more processors are further configured by the machine-readable instructions to:
determine, by the experience adjusting component, multiple users that are to attend the first unit of experience at the same time; and
determine, by the experience adjusting component, an aggregation of the entities that are correlated with the digital assets in the digital wallets of the multiple users, wherein the adjustments to the first unit of experience are based on the aggregation.

5. The system of claim 1, wherein the adjustments to the first unit of experience include adjusting a speed of progression for the unit of experience, a voice narrator, animatronics, a projection of visual content, audible content, and/or a character controlled by the user in a digital environment.

6. The system of claim 1, wherein the one or more processors are further configured by the machine-readable instructions to:
determine, by the experience determination component, a location of the first user at the receipt of the authentication information input, wherein individual units of experiences are associated with a location area or a location path, wherein determining the first unit of experience includes determining whether the location of the first user is within a first location area or location path associated with the first unit of experience.

7. The system of claim 6, wherein the units of experience include a ride attraction, a parade, a show, and a character controlled by the user in a digital environment.

8. The system of claim 1, wherein receiving the authentication request from the first user including receiving the authentication request from a client computing platform associate with the first user or from a client computing platform associated with the first unit of experience through which the first user provided the authentication request.

9. A method to adjust a unit of experience based on digital assets of users, the method comprising:
managing, by a user management component, user information of users including first user information of a first user, the user information including authentication information, addresses recorded on a decentralized ledger and included in digital wallets associated with the users, and identifying information of the users, wherein the decentralized ledger records transactions that include digital assets and the addresses such that the users own the digital assets, wherein the digital assets are correlated with entities, wherein the first user information includes first authentication information, a first address recorded on the decentralized ledger and included in a first digital wallet associated with the first user, and first identifying information of the first user;
receiving, by an authentication component, an authentication request from the first user, wherein the authentication request includes authentication information input for the first user;
determining, by the authentication component, whether the authentication information input is valid by comparing the authentication information input and the first authentication information;

determining, by a digital asset determination component, responsive to determination that the authentication information input is valid, a set of one or more digital assets that are associated with the first address included in the first digital wallet of the first user based on one or more of the transactions including the first address and the one or more digital assets of the set;

determining, by an entity determination component, a set of one or more entities correlated to the set of the one or more digital assets, wherein the entities include content stored in electronic storage;

determining, by an experience determination component, a first unit of experience that the first user is to attend; and determining, by an experience adjusting component, adjustments to the first unit of experience based on the correlated entities; and effectuating, by the experience adjusting component, the adjustments during the first unit of experience.

10. The method of claim 9, further comprising:
determining, by the experience adjusting component, a frequency of the first unit of experience for the first user based on a frequency of receipt of the authentication information input, wherein the determination of the adjustments to the first unit of experience is based on the frequency of the first unit of experience.

11. The method of claim 9, wherein the correlated entities include or are associated with preset preferences for the first user, wherein the determination of the adjustments to the first unit of experience is based on the preset preferences.

12. The method of claim 9, further comprising:
determining, by the experience adjusting component, multiple users that are to attend the first unit of experience at the same time; and determining, by the experience adjusting component, an aggregation of the entities that are correlated with the digital assets in the digital wallets of the multiple users, wherein the adjustments to the first unit of experience are based on the aggregation.

13. The method of claim 9, wherein the adjustments to the first unit of experience include adjusting a speed of progression for the unit of experience, a voice narrator, animatronics, a projection of visual content, audible content, and/or a character controlled by the user in a digital environment.

14. The method of claim 9, further comprising:
determining, by the experience determination component, a location of the first user at the receipt of the authentication information input, wherein individual units of experiences are associated with a location area or a location path, wherein determining the first unit of experience includes determining whether the location of the first user is within a first location area or location path associated with the first unit of experience.

15. The method of claim 14, wherein the units of experience include a ride attraction, a parade, a show, and a character controlled by the user in a digital environment.

16. The method of claim 9, wherein receiving the authentication request from the first user including receiving the authentication request from a client computing platform associate with the first user or from a client computing platform associated with the first unit of experience through which the first user provided the authentication request.

* * * * *